United States Patent
Sherman et al.

(10) Patent No.: US 7,892,649 B2
(45) Date of Patent: Feb. 22, 2011

(54) MICROSTRUCTURED ADHESIVE ARTICLE AND ARTICLES MADE THEREFROM

(75) Inventors: Audrey A. Sherman, St. Paul, MN (US); Mieczyslaw H. Mazurek, Roseville, MN (US); Wendi J. Winkler, Minneapolis, MN (US); Erica J. Draheim, Cottage Grove, MN (US); Larry A. Meixner, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/222,450

(22) Filed: Sep. 8, 2005

(65) Prior Publication Data

US 2007/0054133 A1    Mar. 8, 2007

(51) Int. Cl.
B32B 7/10    (2006.01)

(52) U.S. Cl. .................... 428/447; 428/343; 428/355 R

(58) Field of Classification Search ................. 428/343, 428/355 R, 447
See application file for complete search history.

(56) References Cited

U.S. PATENT DOCUMENTS

| | | | |
|---|---|---|---|
| 5,091,483 A | 2/1992 | Mazurek et al. | |
| 5,141,790 A | 8/1992 | Calhoun et al. | |
| 5,314,748 A | 5/1994 | Mazurek et al. | |
| 5,362,516 A | 11/1994 | Wilson et al. | |
| 5,514,730 A * | 5/1996 | Mazurek et al. | 522/99 |
| 5,650,215 A * | 7/1997 | Mazurek et al. | 428/156 |
| 6,020,408 A * | 2/2000 | Suzuki et al. | 524/265 |
| 6,123,890 A | 9/2000 | Mazurek et al. | |
| 6,630,218 B1 | 10/2003 | Abe | |
| 2003/0082371 A1 | 5/2003 | Mazurek et al. | |
| 2004/0125291 A1 | 7/2004 | Kawahara et al. | |

FOREIGN PATENT DOCUMENTS

| | | |
|---|---|---|
| EP | 0421643 | 4/1991 |
| JP | 2004269564 A * | 9/2004 |
| WO | WO 94/20583 | 9/1994 |
| WO | WO 9420583 A1 * | 9/1994 |

OTHER PUBLICATIONS

Dhoot et al., Encyclopedia of Polymer Science and Technology—Barrier Polymers article, Mar. 15, 2002, John Wiley & Sons, Inc., pp. 198-263.*

(Continued)

*Primary Examiner*—Callie E Shosho
*Assistant Examiner*—Elizabeth Robinson
(74) *Attorney, Agent, or Firm*—Elizabeth A. Gallo

(57) ABSTRACT

An adhesive article comprising a first substrate having thereon an adhesive layer, wherein the adhesive layer comprises a cured adhesive composition of a multifunctional ethylenically unsaturated siloxane polymer; and the first substrate comprises a polymer film, paper, a metal film, glass, ceramic, or a combination thereof; and wherein the adhesive layer has a microstructured surface that is substantiously continuous, and wherein the microstructured surface forms an array or pattern. The adhesive article is used to make laminated articles that spontaneously wet, and when applied to a substrate, remain removable or repositionable, even after long periods of time. The adhesive composition may be used in transfer adhesive films, and in laminated articles suitable for use in optical applications.

17 Claims, 1 Drawing Sheet

OTHER PUBLICATIONS

Doan et al., U.S. Appl. No. 10/914,555, filed Aug. 9, 2004, entitled "Laminated Optical Article".

Sherman, et al., U.S. Appl. No. 10/940,442, filed Sep. 14, 2004, entitled "Optical Film".

Sherman et al., U.S. Appl. No. 11/222,284, filed Sep. 8, 2005, entitled "Adhesive Composition and Articles Made Therefrom".

Privacy film catalog, Jun. 1, 2004 version downloaded on Jan. 5, 2009 from http://web.archive.org/web/20040603185642/decorativefilm.com/OnlineCataloguePage4NewFilms.htm.

Vasile et al., Handbook of Polyolefins, 1993, p. 447.

Kipp, Dale O. (2004). Plastic Material Data Sheets. MatWeb—Division of Automation Creation, Inc. Online version available at: http://knovel.com/web/portal/browse/display?_EXT_KNOVEL_DISPLAY_bookid=1023&VerticleID=0.

Galiatsatos, Encyclopedia of Polymer Science and Technology—Optical Properties article, 2006, pp. 1-28.

* cited by examiner

MICROSTRUCTURED ADHESIVE ARTICLE AND ARTICLES MADE THEREFROM

CROSS-REFERENCE TO RELATED APPLICATION

This application is related to commonly assigned, co-pending U.S. patent application Ser. No. 11/222,284 by Sherman et al., entitled "Adhesive Composition and Articles Made Therefrom", and filed of even date herewith.

FIELD OF THE INVENTION

This invention relates to a microstructured adhesive article comprising a multifunctional siloxane and vinyl monomers. The invention also relates to a laminated article comprising the adhesive article.

BACKGROUND

Adhesive articles such as sheets, films, tapes, etc. are often difficult to apply to a substrate in a precise location and without air entrapment, primarily due to preadhesion or "quick stick" behavior of the adhesive. This is particularly true for adhesive articles that have adhesives with high bond strengths and/or low temperature tack properties. Many methods have been developed in order to make application of adhesive articles easier including, for example, the use of application aids such as soapy solutions or talcs. Adhesive articles having embossed or structured adhesive layers have also been developed, as have adhesive layers that are easily removable and/or repositionable.

SUMMARY

Disclosed herein is an adhesive article comprising a first substrate having thereon an adhesive layer, wherein the adhesive layer comprises a cured adhesive composition of a multifunctional ethylenically unsaturated siloxane polymer and one or more vinyl monomers; and the first substrate comprises a polymer film, paper, a metal film, glass, ceramic, or a combination thereof; wherein the adhesive layer has a microstructured surface that is substantiously continuous and forms an array or pattern. The adhesive article, when applied to a substrate, remains removable or repositionable, even after long periods of time. The adhesive article may be used in transfer adhesive films, and in laminated articles suitable for use in optical applications.

The multifunctional ethylenically unsaturated siloxane polymer is represented by the formula:

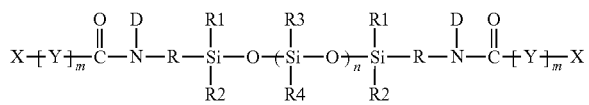

wherein

X is independently a monovalent group having vinyl functionality;

Y is independently a divalent linking group;

D is independently selected from the group consisting of hydrogen, an alkyl group having from about 1 to about 10 carbon atoms, aryl, and substituted aryl;

R is a divalent hydrocarbon group;

$R^1$ is independently selected from the group consisting of alkyl, substituted alkyl, aryl, and substituted aryl;

$R^2$ is independently selected from the group consisting of alkyl, substituted alkyl, aryl, and substituted aryl;

$R^3$ is independently selected from the group consisting of alkyl, substituted alkyl, aryl, substituted aryl, and vinyl;

$R^4$ is independently selected from the group consisting of alkyl, substituted alkyl, aryl, substituted aryl, and vinyl;

m is 0 or 1; and n is an integer from about 15 to about 1000.

The adhesive layer may further comprise a monofunctional ethylenically unsaturated siloxane macromer represented by the formula:

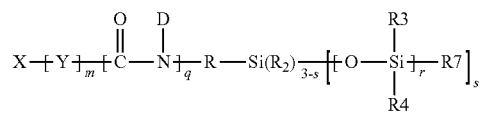

wherein q is 0 or 1;

s is 1, 2, or 3;

r is an integer from about 15 to about 1000;

R7 is a monovalent group selected from the group consisting of alkyl, substituted alkyl, alkoxy, alkyl amino, hydroxyl, aryl, and substituted aryl;

X is independently

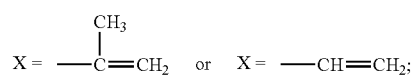

Y is independently

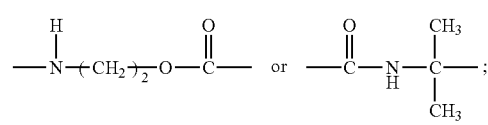

D is independently selected from the group consisting of hydrogen, an alkyl group having from about 1 to about 10 carbon atoms, aryl, and substituted aryl;

R is a divalent hydrocarbon group;

$R^2$ is independently selected from the group consisting of alkyl, substituted alkyl, aryl, and substituted aryl;

$R^3$ is independently selected from the group consisting of alkyl, substituted alkyl, aryl, substituted aryl, and vinyl;

$R^4$ is independently selected from the group consisting of alkyl, substituted alkyl, aryl, substituted aryl, and vinyl; and m is 0 or 1;

with the proviso that when q is 0, Y is

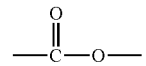

such that X and Y form a (meth)acrylate.

The adhesive layer comprises one or more vinyl monomers. The one or more vinyl monomers may comprise a mixture of soft and hard monomers, wherein the soft monomer is a monomer that when homopolymerized, has a Tg of less than about 0° C., and the hard monomer is a monomer that when homopolymerized, has a Tg of greater than about 0° C. The soft monomer may be an ester of acrylic acid comprising from about 5 to about 21 carbon atoms, an ester of methacrylic acid comprising from about 8 to about 22 carbon atoms, or a combination thereof. The hard monomer may be a branched (meth)acrylate, a (meth)acrylate having from about 5 to about 7 carbon atoms, a vinyl ester of a carboxylic acid, a styrene derivative, an acrylamide derivative, an acrylonitrile derivative, or a combination thereof. In one embodiment, the vinyl monomer comprises isooctyl(meth)acrylate, isobornyl(meth)acrylate, or a combination thereof.

For example, the adhesive layer may comprise from about 2 to about 10 wt. % of the multifunctional ethylenically unsaturated siloxane polymer, from about 2 to about 10 wt. % of the monofunctional ethylenically unsaturated siloxane macromer, and from about 85 to about 96 wt. % of the one or more vinyl monomers.

The adhesive article may further comprise a release liner adjacent the adhesive layer on the opposite side from the first substrate.

Also disclosed herein is a laminated article comprising a first substrate comprising a polymer film, paper, a metal film, glass, ceramic, or a combination thereof; an adhesive layer adjacent the first substrate and comprising a multifunctional ethylenically unsaturated siloxane polymer; and a second substrate adjacent the adhesive layer on the opposite side from the first substrate and comprising a polymer film, paper, a metal film, glass, ceramic, or a combination thereof. The first and/or second substrate may comprise a polarizing film, a prism film, a light guide, a diffusive film, a brightness enhancing film, a liquid crystal display, a glare control film, a transparent surface protective film, a privacy film, or a combination thereof. Also disclosed herein is an optical device comprising the laminated article.

DETAILED DESCRIPTION

Figure 1:
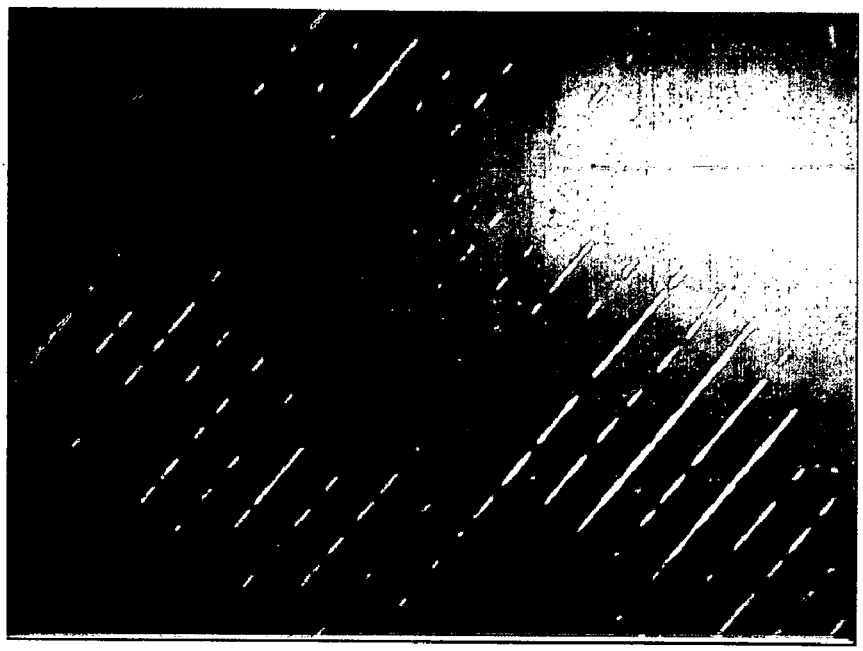
FIG. 1 shows a photograph of an adhesive/glass interface for an adhesive article.

Unless otherwise indicated, all numbers expressing feature sizes, amounts, and physical properties used in the specification and claims are to be understood as being modified by the term "about." Accordingly, unless indicated to the contrary, the numerical parameters set forth in the present specification and claims are approximations that can vary depending upon the desired properties sought to be obtained by those skilled in the art utilizing the teachings disclosed herein.

Disclosed herein is an adhesive article that is suitable for use in optical applications. The adhesive article allows a user to make defect-free laminations between two substrates. Upon contact with a substrate, the adhesive layer of the adhesive article spontaneously wets, and by pulling itself down under its own weight, it can wet the entire surface of the substrate. As such, little or no pressure is required during or after the application step. The ease with which spontaneous wetting occurs means that little or no air is entrapped, even around dirt particles if they are small enough to become "wetted" and encapsulated by the adhesive layer. The adhesive layer does not adhere to itself, making handling easy for the user. The adhesive layer is removable and/or repositionable, even after long periods of time.

The adhesive layer disclosed herein comprises a multifunctional ethylenically unsaturated siloxane polymer and one or more vinyl monomers. Optionally, a monofunctional ethylenically unsaturated siloxane macromer may also be used in the adhesive layer. The multifunctional ethylenically unsaturated siloxane polymer has the formula I:

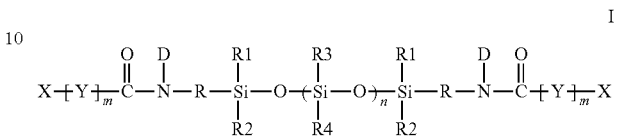

wherein

X is independently a monovalent group having vinyl functionality;

Y is independently a divalent linking group;

D is independently selected from the group consisting of hydrogen, an alkyl group having from about 1 to about 10 carbon atoms, aryl, and substituted aryl;

R is a divalent hydrocarbon group;

$R^1$ is independently selected from the group consisting of alkyl, substituted alkyl, aryl, and substituted aryl;

$R^2$ is independently selected from the group consisting of alkyl, substituted alkyl, aryl, and substituted aryl;

$R^3$ is independently selected from the group consisting of alkyl, substituted alkyl, aryl, substituted aryl, and vinyl;

$R^4$ is independently selected from the group consisting of alkyl, substituted alkyl, aryl, substituted aryl, and vinyl;

m is 0 or 1; and n is an integer from about 15 to about 1000.

One example of the multifunctional ethylenically unsaturated siloxane polymer, referred to as 5 kMAUS, is wherein X is

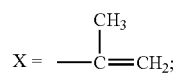

Y is

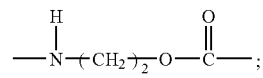

D is hydrogen;

R is

—CH$_2$CH$_2$CH$_2$—;

$R^1$, $R^2$, $R^3$, and $R^4$ are —CH$_3$;

m is 1; and n is an integer from about 15 to about 1000; and

X and Y form a methacrylate.

Another example of the multifunctional ethylenically unsaturated siloxane polymer is wherein X is

Y is

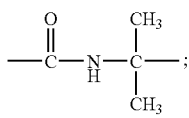

D is hydrogen;
R is

—CH₂CH₂CH₂—;

R¹, R², R³, and R⁴ are —CH₃;
m is 1; and
n is an integer from about 15 to about 1000; and
X and Y form an acrylamide.

Another example of the multifunctional ethylenically unsaturated siloxane polymer is wherein
X is

X=—CH=CH₂;

D is hydrogen;
R is

—CH₂CH₂CH₂—;

R¹, R², R³, and R⁴ are —CH₃;
m is 0; and
n is an integer from about 15 to about 1000.

Still another example of the multifunctional ethylenically unsaturated siloxane polymer is wherein
X is independently

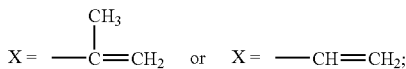

Y is independently

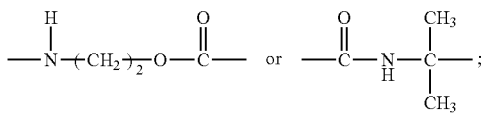

D is hydrogen;
R is

—CH₂CH₂CH₂—;

R¹, R², R³, and R⁴ are —CH₃;
m is 0 or 1;
n is an integer from about 15 to about 1000; and
X and Y form either a (meth)acrylate or a (meth)acrylamide.

The multifunctional ethylenically unsaturated siloxane polymers described above may be prepared as described in U.S. Pat. No. 5,314,748 and WO 94/20583, the disclosures of which are incorporated herein by reference. The amount of multifunctional ethylenically unsaturated siloxane polymer used in the adhesive layer may be up to about 45 wt. %. The amount of multifunctional ethylenically unsaturated siloxane polymer used in the adhesive layer may be also be from 2 to about 35 wt. %, or from 4 to about 20 wt. %.

The adhesive layer may comprise a monofunctional ethylenically unsaturated siloxane macromer having the formula II:

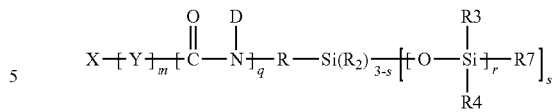

wherein
q is 0 or 1;
s is 1, 2, or 3;
r is an integer from about 15 to about 1000;
R7 is a monovalent group selected from the group consisting of alkyl, substituted alkyl, alkoxy, alkyl amino, hydroxyl, aryl, and substituted aryl;
X is independently

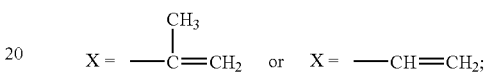

Y is independently

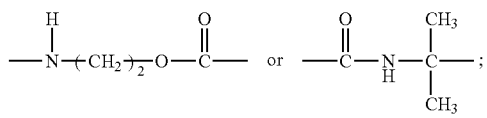

D is independently selected from the group consisting of hydrogen, an alkyl group having from about 1 to about 10 carbon atoms, aryl, and substituted aryl;
R is a divalent hydrocarbon group;
R² is independently selected from the group consisting of alkyl, substituted alkyl, aryl, and substituted aryl;
R³ is independently selected from the group consisting of alkyl, substituted alkyl, aryl, substituted aryl, and vinyl;
R⁴ is independently selected from the group consisting of alkyl, substituted alkyl, aryl, substituted aryl, and vinyl; and
m is 0 or 1;
with the proviso that when q is 0, Y is

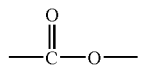

such that X and Y form a (meth)acrylate.

In one embodiment, the monofunctional ethylenically unsaturated siloxane macromer has a molecular weight of about 10,000 such that r is from about 120 to about 150. In another embodiment, r is from about 130 to about 135; this monofunctional ethylenically unsaturated siloxane macromer is referred to as 10 kMAC. Preparation of monofunctional ethylenically unsaturated siloxane macromer may be found in WO 94/20583, the disclosure of which is incorporated herein by reference. The amount of monofunctional ethylenically unsaturated siloxane macromer used in the adhesive layer may be up to about 45 wt. %. The amount of monofunctional ethylenically unsaturated siloxane macromer used in the adhesive layer may be also be from 2 to about 35 wt. %, or from 4 to about 20 wt. %.

The adhesive layer comprises one or more vinyl monomers. A variety of one or more vinyl monomers may be used in the adhesive layer. In one embodiment, the one or more vinyl monomer comprises a mixture of soft and hard monomers, wherein the soft monomer is a monomer that when homopolymerized, has a Tg of less than about 0° C., and the hard monomer is a monomer that when homopolymerized, has a Tg of greater than about 0° C.

In general, the soft monomer is chosen such that a tacky or tackiflable adhesive layer may be obtained. Examples of soft monomers include esters of acrylic acid comprising from about 5 to about 21 carbon atoms, esters of methacrylic acid comprising from about 8 to about 22 carbon atoms, and combinations thereof. For example, the soft monomers may be isooctyl acrylate, 2-ethylhexyl acrylate, butyl acrylate, 2-methylbutyl acrylate, 4-methyl-2-pentyl acrylate, sec-butyl acrylate, isononyl acrylate, isodecyl acrylate, or mixtures thereof.

In general, the hard monomer is chosen such that cohesive strength of adhesive layer may be obtained. Examples of hard monomers include branched (meth)acrylates, (meth)acrylates having from about 5 to about 7 carbon atoms, vinyl esters of a carboxylic acid, styrene derivatives, acrylamide derivatives, acrylonitrile derivatives, or a combination thereof. For example, the hard monomers may be cyclohexyl (meth)acrylate, isobornyl(meth)acrylate, t-butyl(meth)acrylate, vinyl acetate, isopropenyl acetate, styrene, vinyl toluene, (meth)acrylic acid, hydroxyethyl (meth)acrylate, hydroxypropyl(meth)acrylate, (meth)acrylamide, N,N-dimethylacrylamide, (meth)acrylonitrile, N-vinyl pyrrolidone, N-vinyl caprolactam, vinylidene chloride, or a combination thereof.

In one embodiment, the one or more vinyl monomer comprises isooctyl (meth)acrylate, isobornyl(meth)acrylate, or a combination thereof.

The amount of one or more vinyl monomer in the adhesive layer may be from about 55 to about 98 wt. % relative to the total amount of the adhesive layer. For mixtures of soft and hard monomers, the soft monomer may be from about 30 to about 98 wt. % of the total amount of the one or more vinyl monomers.

In one embodiment, the adhesive layer may comprise from about 2 to about 10 wt. % multifunctional ethylenically unsaturated siloxane polymer, from about 2 to about 10 wt. % monofunctional ethylenically unsaturated siloxane macromer, and from about 85 to about 96 wt. % one or more vinyl monomer.

One or more crosslinkers may be used in the adhesive layer. Examples of crosslinkers include 1,6- hexanediol di(meth)acrylate; 1,4-butanediol diacrylate; and trimethylolpropane triacrylate. In general, the amount of crosslinker is less than about 5 wt. % relative to the total weight of the adhesive layer.

The adhesive layer comprises a cured adhesive layer of a multifunctional ethylenically unsaturated siloxane polymer. UV radiation may be used for curing, for example, by using fluorescent black light bulbs as described in U.S. Pat. No. 4,181,752; these bulbs provide a rate of irradiation in the 300 to 400 nm wavelength region of not more than 7 milliwatts per square centimeter, and hence are characterized as low intensity. Suitable photoinitiators include benzoin ethers, benzophenone and derivatives thereof, acetophenone derivatives, camphorquinone, and mixtures thereof. Polymerization may also be carried out using thermal radiation in the presence of a thermal initiator. Suitable thermal initiators include peroxides, e.g., lauroyl peroxide, azo compounds, e.g., azo-bis-isobutyronitrile, persulfates, e.g., sodium persulfate and potassium persulfate. In general, photoinitiators and thermal initiators comprise no more than about 5 wt. % relative to the total weight of the adhesive layer.

Small amounts of a non-reactive diluent may be added to the adhesive layer in order to improve homogeneity. Examples of suitable diluents that do not interfere with polymerization of the mixture include ethyl acetate, cyclohexane, hexane, toluene, butyl acetate, octamethyl and cyclotetrasiloxane. If used, the diluent may comprise from about 1 to about 20 wt. % based upon the total weight of the multifunctional vinyl siloxane, the one or more vinyl monomer, the macromer, and the photoinitiator. The particular diluent and amount used should provide homogeneity without requiring an extensive post-polymerization drying step.

Any conventional coating method may be used to coat the adhesive layer, e.g., roll coating, knife coating, curtain coating, or extrusion. The adhesive layer is typically coated between a first substrate and a release liner, and cured during and/or after the coating process. The adhesive layer may be from about 5 um (0.2 mil) to about 508 um (20 mil).

The adhesive article disclosed herein comprises a first substrate which may be a polymer film, paper, a metal film, glass, ceramic, or a combination thereof. The first substrate may be an optical film, i.e., a film that manages light passing therethrough. Examples of optical films include a polarizing film, a prism film, a light guide, a diffusive film, a brightness enhancing film, a liquid crystal display, a glare control film, a transparent surface protective film, a privacy film, or a combination thereof. For a more detailed description of useful optical films, see U.S. application Ser. No. 10/914,555, the disclosure of which is incorporated herein by reference.

The first substrate may be clear or opaque, or it may have varying degrees of transparency depending on the particular application, function, use, etc. For example, the first and/or second substrates may have a visible light transmission of 40% or greater, 70% or greater, 90% or greater, or 95% or greater. The optical substrates may also have any haze value, for example, 15% or less, 5% or less, or 1% or less.

The first substrate may comprise a polymer film comprising one or more polymers such as cellulose acetate butyrate, cellulose acetate propionate, cellulose triacetate, poly(meth)acrylate, polyether sulfone, polymethyl methacrylate, polyurethane, polyester, polycarbonate, polyvinyl chloride, syndiotactic polystyrene, cyclic olefin copolymers, polyethylene terephthalate, polyethylene naphthalate, and copolymers or blends based on naphthalene dicarboxylic acids.

The adhesive layer has a microstructured surface that is substantiously continuous and forms an array or pattern. Such a microstructured surface may comprise a microstructure having at least two lateral dimensions (i.e. dimensions in the plane of the film) less than 1.4 mm (55 mils), made as described, for example, in U.S. Pat. Nos. 6,197,397; 6,123, 890; 6,838,142 B2; and 6,838,150 B2; which are incorporated herein by reference. The microstructured surface may comprise, for example, a series of shapes including ridges, posts, pyramids, hemispheres and cones, and/or they may be protrusions or depressions having flat, pointed, truncated, or rounded parts, any of which may have angled or perpendicular sides relative to the plane of the surface. The microstructured surface may have a pattern, be random, or a combination thereof. The microstructured surface may impart substantially continuous open pathways or grooves into the adhesive composition layer from an exposed surface. The microstructured surface may be as described in U.S. Pat. No. 6,123,890, the disclosure of which is incorporated herein by reference.

The adhesive article may further comprise a release liner adjacent the adhesive layer on the side opposite the first substrate. The release liner may be any microstructured release liner or transfer liner known to those skilled in the art and that is capable of being placed in intimate contact with the adhesive layer and subsequently removed without damaging the adhesive layer. The release liner can be a polymer-coated paper with a release coating, a polyethylene coated polyethylene terephthalate film with a release coating, or a cast polyolefin film with a release coating.

Disclosed herein is a laminated article comprising: a first substrate comprising a polymer film, paper, a metal film, glass, ceramic, or a combination thereof; an adhesive layer adjacent the first substrate and comprising a multifunctional ethylenically unsaturated siloxane polymer; and a second substrate adjacent the adhesive layer on the opposite side from the first substrate and comprising a polymer film, paper, a metal film, glass, ceramic, or a combination thereof. The first substrate and the adhesive layer are described above, and the second substrate may be described the same as the first substrate. The first and/or second substrate may comprise a polarizing film, a prism film, a light guide, a diffusive film, a brightness enhancing film, a liquid crystal display, a glare control film, a transparent surface protective film, a privacy film, or a combination thereof.

Adhesive articles and laminated articles disclosed herein may be used to prepare optical articles which are suitable for use in optical applications, devices, etc. For example, optical articles may be any of those described above wherein the first and/or second substrate comprises a polarizing film, a prism film, a light guide, a diffusive film, a brightness enhancing film, a liquid crystal display, a glare control film, a transparent surface protective film, a privacy film, or a combination thereof.

The properties of the optical articles disclosed herein may depend on the particular application. Haze of useful optical articles may be 15% or less, 10% or less, 5% or less, 3% or less, or 1% or less, or 0 to 1%. Visible light transmission of useful optical articles may be in a range of 40% or greater, 50% or greater, or 70% or greater, 80% or greater, 90% or greater, or 95% or greater.

Disclosed herein is an optical device comprising any of the laminated articles described above. Examples of optical devices include hand-held device such as cellular phones, personal data assistants, and electronic games; larger size devices such as laptop computers, computer monitors, televisions, etc. or any other light management device.

EXAMPLES

Example 1

A syrup of partially polymerized 2-ethylhexyl acrylate (2 EHA) was prepared according to methods described in U.S. Pat. No. 4,233,067; the photoinitiator was 0.04% Irgacure® 651 (Ciba Specialty Chemicals). An additional 0.16% Irgacure® 651 was added to the syrup to make a base 100% 2 EHA syrup.

A 90:10 mixture 100% 2 EHA syrup and 5 kMAUS was prepared, and a few mL were placed on a microstructured release liner having an intersecting ridges that form contiguous square pyramids in the adhesive surface. The dimensions were 200 um base with 8 degree sidewall angles. Then it was covered with a piece of 5 mil polyethylene terephthalate (PET) having a scratch resistant topcoat exposed. The resulting laminate was squeezed to a predetermined thin layer thickness by passing the laminate under a knife coater with a gap that corresponded to the predetermined thickness. Care was taken to force air to the edges of the coated area with uniform thickness. The laminate was subjected to UV irradiation using a 46 cm (18 inch) desk lamp with 2 blacklight bulbs for 30 min.

The release liner was removed and the remaining laminate was placed onto a computer monitor such that the adhesive of the remaining laminate was adjacent the glass of the computer monitor. There was a noticeable Moiré pattern that disappeared as the film was pressed with a finger, which showed that the microstructure disappeared. No air bubbles were present, which showed that there was air bleed from the adhesion interface. The sample was repeatedly removed and replaced with similar results. Several days passed before removal on some cycles without noticeable increase in adhesion.

Another laminate was prepared as described above, except that a flat release liner was used in place of the microstructured liner. The flat liner was removed and the remaining laminate evaluated as described above. This laminate could not be placed without entrapping air at the adhesion interface.

Example 1 shows that if the adhesive layer is microstructured, then the adhesive layer may be separated from a substrate. In addition, the microstructure on the adhesive surface recovers upon removal from the glass. Also, the adhesive layer did not form immediate bonds with itself, thus allowing the adhesives surfaces to come in contact and be simply separated without damage.

Example 2

Laminates were prepared as described for Example 1, except that the adhesive composition was made from a syrup having 80/10/10 of 100% 2 EHA syrup, 5 kMAUS, and methyl methacrylate. This adhesive composition performed similarly to the adhesive composition of Example 1, except that this adhesive composition was stiffer and had lower adhesion, which made complete wetout difficult.

Example 3

Preparation of PSAs

Various adhesive compositions comprising isooctyl acrylate (IOA), 5 kMAUS, and 10 kMAC were prepared as described in Table 1. 5 kMAUS and 10 kMAC were prepared as described in WO 94/20583.

TABLE 1

| Adhesive Composition | IOA (Wt. %) | 5K-MAUS (Wt. %) | 10K-Mac (Wt. %) |
|---|---|---|---|
| 1 | 97.5 | 2.5 | 0 |
| 2 | 95 | 5.0 | 0 |
| 3 | 90 | 10.0 | 0 |
| 4 | 95 | 2.0 | 3.0 |
| 5 | 90 | 5.0 | 5.0 |
| 6 | 90 | 3.0 | 7.0 |
| 7 | 90 | 7.0 | 3.0 |
| 8[1] | 95 | 0 | 5 |
| 9[1] | 90 | 0 | 10 |
| 10[1] | 100 | 0 | 0 |

[1]Plus 0.25 wt. % of 1,6-hexanediol diacrylate.

Evaluation of Peel Adhesion

Adhesive articles comprising the adhesive compositions described in Table 1 were prepared by coating each adhesive composition at a thickness of 2 mil between a release liner and a 5 mil 618 type polyethylene terephthalate (PET) film (from ICI) using a set gap on a notch bar. Two different release liners were used. One was a flat release liner of 2 mil PET with silicone release layer. The other was a microstructured release liner having an intersecting ridges that form contiguous square pyramids in the adhesive surface. The dimensions were 200 um base with 8 degree sidewall angles. The adhesive articles were then cured using UV blacklight for 10 minutes for a total dose of about 1000 mJ/cm².

For each adhesive article, a strip (2.5 cm by 20 cm) was cut, and the liner removed to expose the adhesive layer, which was then laminated using a 1.7 kg (4.5 lb.) rubber roller, to window glass that had been cleaned with isopropanol and Kimwipes. A tab of 1 to 2.5 cm was extended beyond the end of the glass. The roller was positioned at one end, and slowly rolled down and back in about 3 seconds without any additional pressure. The laminate was visually inspected in order to ensure that 100% wet-out had been obtained (no gross bubble could be seen with the naked eye).

For each laminate, a piece of 898 type glass fiber reinforced strapping tape (2.5 cm by 30 cm) was applied to the free end of the PET layer extending beyond the glass and double-backed upon itself, adhesive to adhesive, as an extension to the jaws of the test jig. The 90° peel adhesion was tested using a SP2000 peel tester (from IMASS) with a 90° attachment, with conditions 229 cm/min (90 inch/min), 2 second delay, and 2 second data acquisition. Three tests were performed for each laminate, and average values are reported in Table 2. The laminates having the microstructed silicone-coated release liner were then aged by storing them flat in single layers with spacers in between, in order to prevent contact with each other. After 7 days the 90° peel adhesion was measured and the results are reported in Table 2.

TABLE 2

| Adhesive Article | Adhesive Composition | Liner | Initial Adhesion Force (g/inch) | Adhesion Force After 1 Wk, RT (g/inch) |
|---|---|---|---|---|
| 1 | 2 | microstructured | 143 | 142 |
| 2 | 3 | microstructured | 81 | 83 |
| 3 | 5 | microstructured | 55 | 83 |
| 4 | 1 | microstructured | 214 | 180 |
| Comparative 2 | 2 | flat | 275 | 260 |
| Comparative 3 | 3 | flat | 160 | 228 |
| Comparative 10 | 10 | microstructured | 401 | 327 |

NM = not measured

The data in Table 2 show that, for the adhesive compositions used with microstructured liners, the initial adhesion force is low so that the adhesive article is easily removable from the glass, and the adhesion force stays low, even after 1 week at room temperature. It was observed that, for the same compositions, when microstructured liners were utilized, it was easier to laminate without trapping air.

Evaluation of % Wet-Out

Adhesive articles were prepared as described above. For each sample, a 5.0 cm wide strip of black plastic tape (471 from 3M Co.) was laminated to the PET using a squeegee in order to get good contact. If bubbles or wrinkles were formed, a new strip of tape was used. After 4 hours, the sample was placed on a cutting surface with the liner side up, and a 2.5 cm by 5.0 cm strip was cut through the layers including the black plastic tape. After removing the liner, the exposed adhesive was placed without pressure on the center of a clean glass slide. A rubber roller 5.0 cm wide and 1.7 kg (4.5 lb.) was positioned at one end, and slowly rolled down and back in about 3 seconds without pressure beyond the weight of the roller.

The hardware used with this technique consisted of a stereo-microscope (Olympus Model SZH-ZB), a video-camera (Cohu Model 4815) mounted on the stereo-microscope, a coaxial vertical illuminator (Olympus Model TL2), and a computer (Hewlett-Packard Vectra QS/20) with a video digitizing board (Imaging Technologies PCVISIONplus) installed which allows the computer to capture and digitize an image. Such an image can subsequently be stored and analyzed by commercial software packages (Jandel JAVA). The coaxial vertical illuminator provides light which is sent through the lens (i.e., the optic axis) to illuminate the subject. This light passes through a circular polarizer mounted on the end of the planar objective lens of the microscope.

The slides having the adhesives mounted thereon were each positioned on the stereo-microscope perpendicular to the optic axis and with the glass side facing up. With the adhesive/glass interface viewable through the glass, the circular polarizer was adjusted to optimize light intensity and contrast (the black plastic tape was used to improve contrast). Using image analysis software (Image J), images were captured and digitized. The software grey value window of acceptance was set to accept only those grey values (i.e., brightness levels) corresponding to the wet areas. The % wet-out was calculated as the total wetted area as a percentage of the total imaged area. Results are tabulated in Table 3.

TABLE 3

| Adhesive Article | Adhesive Composition | % Wet-Out After 1 min | % Air at Interface After 1 min | % Wet-Out After 16 hrs | % Air at Interface After 16 hrs |
|---|---|---|---|---|---|
| 3 | 5 | 99.1 | 0.9 | 99.5 | 0.5 |
| 4 | 1 | 98.5 | 1.5 | 99.4 | 0.6 |
| 2 | 3 | 96.9 | 3.1 | 99.7 | 0.3 |
| Comparative 10 | 10 | 95.9 | 4.1 | 99.4 | 0.6 |

The results in Table 3 show that a greater % wet-out may be obtained after 1 minute if the adhesive article comprises the ethylenically unsaturated siloxane polymer.

Figure 2:
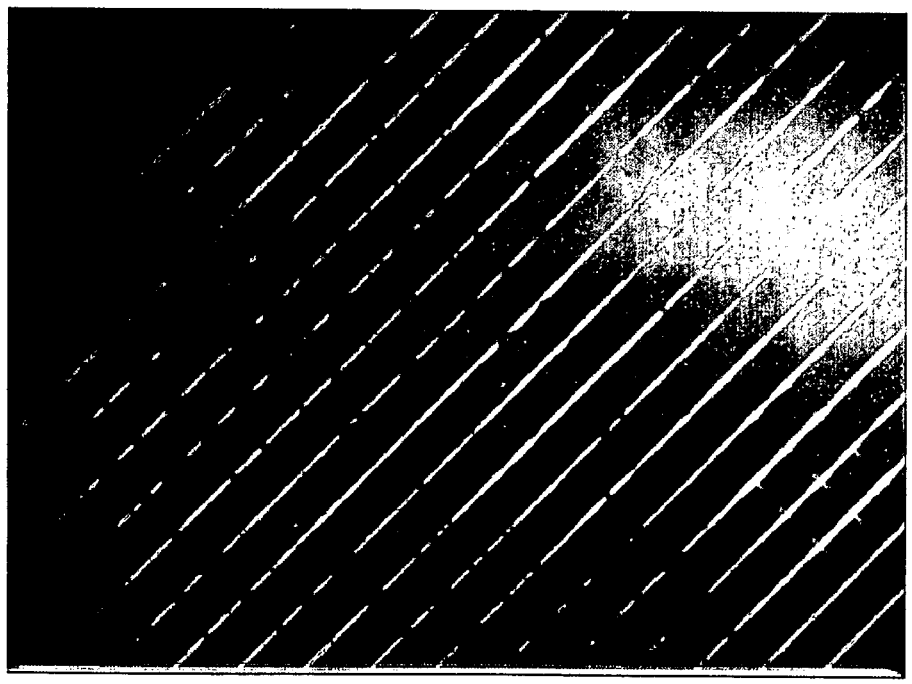
FIG. 2 shows a photograph of an adhesive/glass interface for an adhesive article.

FIG. 1 shows a photograph of the adhesive/glass interface for Adhesive Article 3 having 99.1% wet-out. FIG. 2 shows a photograph of the adhesive/glass interface for Adhesive Article 2 having 96.9% wet-out.

Various modifications and alterations of the invention will become apparent to those skilled in the art without departing from the spirit and scope of the invention.

What is claimed is:

1. An adhesive article comprising:
   a first substrate comprising a polymer film, paper, a metal film, glass, ceramic, or a combination thereof; and
   an adhesive layer disposed on the first substrate and comprising a cured product of an adhesive composition, the adhesive composition comprising from about 2 to about 10 wt. % of a multifunctional ethylenically unsaturated siloxane polymer, from about 2 to about 10 wt. % of the monofunctional ethylenically unsaturated siloxane macromer, and from about 85 to about 96 wt. % of one or more vinyl monomers;
   wherein the adhesive layer has a microstructured surface that is substantiously continuous and forms an array or pattern.

2. The adhesive article of claim 1, wherein the multifunctional ethylenically unsaturated siloxane polymer is represented by the formula:

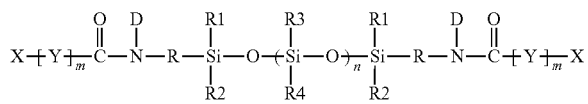

wherein
X is independently a monovalent group having vinyl functionality;
Y is independently a divalent linking group;
D is independently selected from the group consisting of hydrogen, an alkyl group having from about 1 to about 10 carbon atoms, aryl, and substituted aryl;
R is a divalent hydrocarbon group;
R1 is independently selected from the group consisting of alkyl, substituted alkyl, aryl, and substituted aryl;
R2 is independently selected from the group consisting of alkyl, substituted alkyl, aryl, and substituted aryl;
R3 is independently selected from the group consisting of alkyl, substituted alkyl, aryl, substituted aryl, and vinyl;
R4 is independently selected from the group consisting of alkyl, substituted alkyl, aryl, substituted aryl, and vinyl;
m is 0 or 1; and
n is an integer from about 15 to about 1000.

3. The adhesive article of claim 2, wherein
X is

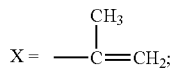

Y is

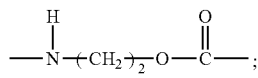

D is hydrogen;
R is

R1, R2, R3, and R4 are —CH$_3$;
m is 1; and
n is an integer from about 15 to about 1000; and
X and Y form a methacrylate.

4. The adhesive article of claim 2, wherein
X is

Y is

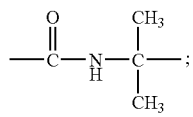

D is hydrogen;
R is

R1, R2, R3, and R4 are —CH$_3$;
m is 1; and
n is an integer from about 15 to about 1000; and
X and Y form an acrylamide.

5. The adhesive article of claim 2, wherein
X is

D is hydrogen;
R is

R1, R2, R3, and R4 are —CH$_3$;
m is 0; and
n is an integer from about 15 to about 1000.

6. The adhesive article of claim 2, wherein
X is independently

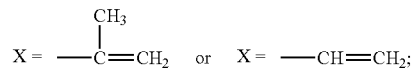

Y is independently

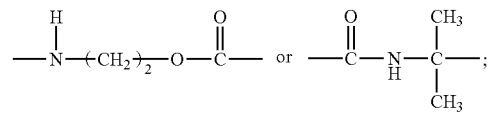

D is hydrogen;
R is

R1, R2, R3, and R4 are —CH$_3$;
m is 0 or 1;
n is an integer from about 15 to about 1000; and
X and Y form either a (meth)acrylate or a (meth)acrylamide.

7. The adhesive article of claim 1, wherein the monofunctional ethylenically unsaturated siloxane macromer is represented by the formula:

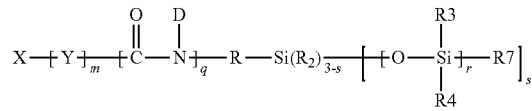

wherein
q is 0 or 1;
s is 1, 2, or 3;
r is an integer from about 15 to about 1000;
R7 is a monovalent group selected from the group consisting of alkyl, substituted alkyl, alkoxy, alkyl amino, hydroxyl, aryl, and substituted aryl;
X is independently

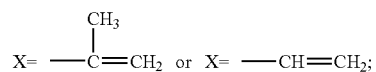

Y is independently

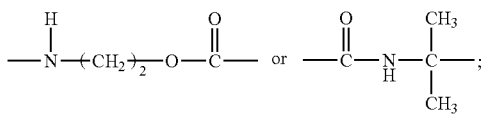

D is independently selected from the group consisting of hydrogen, an alkyl group having from about 1 to about 10 carbon atoms, aryl, and substituted aryl;
R is a divalent hydrocarbon group;
$R^2$ is independently selected from the group consisting of alkyl, substituted alkyl, aryl, and substituted aryl;
R3 is independently selected from the group consisting of alkyl, substituted alkyl, aryl, substituted aryl, and vinyl;
R4 is independently selected from the group consisting of alkyl, substituted alkyl, aryl, substituted aryl, and vinyl; and
m is 0 or 1;
with the proviso that when q is 0, Y is

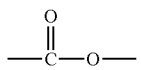

such that X and Y form a (meth)acrylate.

8. The adhesive article of claim 7, wherein r is from about 120 to about 150.

9. The adhesive article of claim 8, wherein r is from about 130 to about 135.

10. The adhesive article of claim 1, wherein the one or more vinyl monomers comprises a mixture of soft and hard monomers, wherein
the soft monomer comprises a monomer that when homopolymerized, has a Tg of less than about 0° C., and
the hard monomer comprises a monomer that when homopolymerized, has a Tg of greater than about 0° C.

11. The adhesive article of claim 10, wherein the soft monomer is an ester of acrylic acid comprising from about 5 to about 21 carbon atoms, an ester of methacrylic acid comprising from about 8 to about 22 carbon atoms, or a combination thereof.

12. The adhesive article of claim 10, wherein the soft monomer is isooctyl acrylate, 2-ethylhexyl acrylate, butyl acrylate, 2-methylbutyl acrylate, 4-methyl-2-pentyl acrylate, sec-butyl acrylate, isononyl acrylate, isodecyl acrylate, or a combination thereof.

13. The adhesive article of claim 10, wherein the hard monomer is a branched (meth)acrylate, a (meth)acrylate having from about 5 to about 7 carbon atoms, a vinyl ester of a carboxylic acid, a styrene derivative, an acrylamide derivative, an acrylonitrile derivative, or a combination thereof.

14. The adhesive article of claim 10, wherein the hard monomer is cyclohexyl (meth)acrylate, isobornyl (meth)acrylate, t-butyl (meth)acrylate, vinyl acetate, isopropenyl acetate, styrene, vinyl toluene, (meth)acrylic acid, hydroxyethyl (meth)acrylate, hydroxypropyl (meth)acrylate, (meth)acrylamide, N,N-dimethylacrylamide, (meth)acrylonitrile, N-vinyl pyrrolidone, N-vinyl caprolactam, vinylidene chloride, or a combination thereof.

15. The adhesive article of claim 10, wherein the one or more vinyl monomers comprises isooctyl (meth)acrylate, isobornyl (meth)acrylate, or a combination thereof.

16. The adhesive article of claim 1, further comprising a release liner adjacent the adhesive layer on the side opposite the first substrate.

17. The adhesive article of claim 1, further comprising a second substrate adjacent the adhesive layer on the opposite side from the first substrate, wherein the second substrate comprises a polymer film, paper, a metal film, glass, ceramic, or a combination thereof.

* * * * *

UNITED STATES PATENT AND TRADEMARK OFFICE
CERTIFICATE OF CORRECTION

| | | |
|---|---|---|
| PATENT NO. | : 7,892,649 B2 | Page 1 of 1 |
| APPLICATION NO. | : 11/222450 | |
| DATED | : February 22, 2011 | |
| INVENTOR(S) | : Audrey A Sherman | |

It is certified that error appears in the above-identified patent and that said Letters Patent is hereby corrected as shown below:

Page 2, Column 2,
Under "Other Publications", Line 6, delete "Verticle" and insert -- Vertical --.

Column 11,
Line 24, delete "microstructed" and insert -- microstructured --.

Column 15,
Line 13, delete "$R^2$" and insert -- $R_2$ --.

Signed and Sealed this
Fourteenth Day of June, 2011

David J. Kappos
*Director of the United States Patent and Trademark Office*